United States Patent [19]

Heizmann

[11] Patent Number: 4,713,707
[45] Date of Patent: Dec. 15, 1987

[54] TRACKING MOUNT FOR A CONTACTLESS RECORDING AND/OR REPRODUCING HEAD

[75] Inventor: Frieder Heizmann, Denens, Switzerland

[73] Assignee: Robert Bosch GmbH, Stuttgart, Fed. Rep. of Germany

[21] Appl. No.: 789,614

[22] Filed: Oct. 21, 1985

[51] Int. Cl.⁴ .................... G11B 5/55; G11B 21/08
[52] U.S. Cl. ........................ 360/106; 360/109; 369/219; 369/222; 369/223; 369/244
[58] Field of Search ............. 360/106, 109, 97–99; 369/223, 215, 222, 221, 144, 244, 219

[56] References Cited

U.S. PATENT DOCUMENTS

| | | | |
|---|---|---|---|
| 4,135,722 | 1/1979 | Paulson et al. | 369/222 |
| 4,450,493 | 5/1984 | Watrous | 360/106 |
| 4,583,135 | 4/1986 | Kimura | 360/109 |
| 4,599,667 | 7/1986 | van Blerk | 360/106 |
| 4,605,977 | 8/1986 | Matthews | 360/109 |

OTHER PUBLICATIONS

Lissner et al., "Disk File Actuator Design Permits Increased Track Density", Computer Design, vol. 18, No. 2, Feb. 1979, pp. 116–120.

Primary Examiner—John H. Wolff
Assistant Examiner—Matthew J. Bussan
Attorney, Agent, or Firm—Frishauf, Holtz, Goodman & Woodward

[57] ABSTRACT

A contactless (flying) transducer for scanning a record or recording disc is mounted near the free end of a pivoted arm which is driven in rotation about its pivot by the tangential drive provided by a restrained nut on a threaded motor-driven spindle. A pin extending from the nut slides without play in a lengthwise groove at the free end of the arm. Rapid operation of the electric motor makes it easy to shift from one part of the record to another and slow movement makes it easy to register precisely with a track. Still finer movement is possible electrically by shifting the transducer on the arm.

2 Claims, 1 Drawing Figure

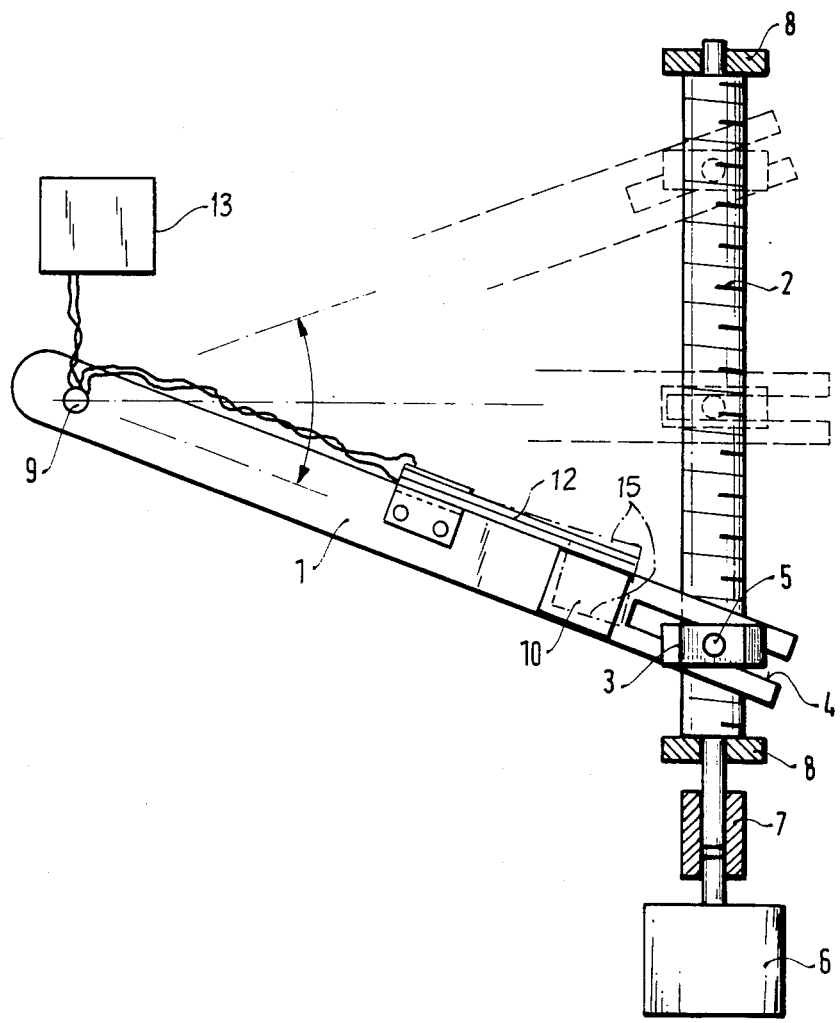

TRACKING MOUNT FOR A CONTACTLESS RECORDING AND/OR REPRODUCING HEAD

This invention concerns a driven mounting for a recording and/or reproducing flying head for contactless recording and/or contactless reproduction on or from a record. More particularly, it concerns a device for the kind that uses a swinging arm to support the head.

It is already known, for example in connection with compact disc players, to perform the scanning of the disc, which involves a tracking movement to provide a spiral track, by applying an axial rotary drive to a swinging arm carrying a transducer at its end. Relatively great masses need to be moved by the axial drive, which is particularly disadvantageous for tracking, since in this case the displacements that are required, although they are rapid, are only of the smallest magnitude. If the arm is long, moreover, it is difficult and possible only with expensive mechanical means to control the rotary movement so precisely that successful tracking results. Devices of this kind therefore have the disadvantage that a bulky drive and scanning system is necessary, which is constituted for high mechanical stability. Such equipment is on the one hand heavy and voluminous and on the other hand expensive to manufacture. To avoid this type of scanning it has already been proposed that the scanning be performed with a coarse linear movement which is supplemented by a superimposed tracking drive. In this case the reproducing head, for instance, is guided on a slider in a radial direction above the record disc. This guiding only coarsely locates the track and the tracking itself is produced for the laser scanning by a small positioning movement of the objective, so that only relatively small masses need to be moved so that the record can be tracked well. In this arrangement there is the disadvantage that the lengthwise displacement along the radius involves relatively high complication and expense. Even though the problem of tracking is relatively simple to solve, since now only the small mass of the objective needs to be moved, a lengthwise movement is nevertheless much more expensive to provide mechanically and constructionally than a rotary movement.

SUMMRY OF THE INVENTION

It is an object of the present invention to provide movement of the transducer head for use with a record that revolves in place which avoids the disadvantages of the two different kinds of tracking drives above described.

Briefly, a pivoted arm on which the transducer head is mounted is arranged to be moved by means of a tangentially displaceable pin. Thus the apparatus of the invention has the advantage that the favorable properties of rotary movement regarding reliability of operation and simple mechanical construction are obtained while at the same time, by the special manner of driving the arm, exact tracking of the record to be played or to be made is possible, even when the fine adjustment of the tracking is produced by movement of a small mass, e.g. the mass of the objective of a laser pick-up or a recorder.

It is particularly advantageous for the tangentially displaceable pin to be disposed so that it projects into a slot of the rotary arm. The construction of the device is then particularly simple mechanically. It is further desirable for the pin to be connected with a threaded nut, the position of which is variable along the length of a threaded spindle. By this arrangement, a particularly favorable fine adjustment is obtained. A particularly exact and fine calibration of the arm is obtainable on the basis of the high mechanical translation ratio.

Finally, it is advantageous to drive the threaded spindle by an electric motor. With an electric motor, on the one hand, a rapid position change can be obtained at the full speed of the motor and, on the other hand, fine adjustment is carried out at a very low speed of the motor. It is particularly advantageous in this device to combine the advantages of rotary movement with the advantages of the subdivided movement by which only a small mass needs to be moved for fine tracking.

BRIEF DESCRIPTION OF THE DRAWING

The invention is further described by way of illustrative example with reference to the annexed drawing, in which the single FIGURE schematically shows a top view of the device according to the invention using a lead-screw spindle and an arm.

DESCRIPTION OF THE ILLUSTRATED EMBODIMENT

In the recording and reproduction of signals, for example digital data signals or speech and music signals, there have recently been used methods and apparatus in which the recorder/reproducer head is no longer guided by a groove as they were in the case of the conventional disc sound records. Thus in the case of floppy discs used in connection with computer systems, tangentially guided magnetic transducer heads were provided which were positioned on magnetic tracks. Mechanical tracking thus was omitted in these devices and was replaced by electrical tracking.

Recent delopment also shows the tendency to increase the signal density on the storage medium. One scheme for obtaining this result is to place the tracks very densely next to each other. Tracks thus crowded together require ever higher care and expense for track-locating and for maintaining a track that has once been selected. If the tracks are optically produced and, for example, scanned for signal reproduction by a laser beam, as is the case in many video disc players or in the case of so-called compact disc players, particularly high requirements for tracking are found. In order to attain the precision there required at relatively low technical complication and expense, the art has departed from the use of the functionally reliable rotary movement of the pick-up arm in the form heretofore known in connection with grooved sound records. Instead, attempts are made to solve the problem by the use of a coarse lengthwise movement on a spindle in a direction across the tracks, such as has been found useful in the scanning of magnetic discs in computer technology.

The annexed drawing shows only one solution of the problem in accordance with the invention in which the advantages of rotary movement are utilized and nevertheless a highly exact and accurate tracking of a track that has been once selected takes place.

In the drawing there is shown the mechanism for moving a pick-up head such as is suitable, for example, for scanning compact discs or video discs for signal reproduction. In the drawing, an arm 1 is shown that is mounted so as to pivot by means of a vertical pivot stud or pin 9 at or near one end of the arm. At its other end, the arm has a bifurcating slot 4 into which a pin 5 projects, at right angles to the arm 1, preferably without any play at all. The pin 5 connects with a threaded rider 3 mounted on a lead-screw spindle 2. The spindle 2 is held by two bearings 8, preferably without any play. A connection sleeve 7 connects the lead-screw spindle 2 with an electric motor 6. The rider collar 3 in this case is shown as a simple hex-nut.

Of course, the pin 5 could also be fixed on the arm 1 and the collar or nut 3 could have a socket slot or elongated cavity into which the pin 5 fits, preferably without any play.

The drive of the rotary movement takes place tangentially by means of the lead-screw spindle 2 and the collar which is provided with restraint against turning with the spindle. By the turning of the motor, the nut 3 is moved tangentially to the pivot 9, so that the arm 1 can be put into different positions in each of which one track of the disc to be scanned could be picked up. One such position is shown in solid lines in the drawing and two other possible positions are shown in broken lines. The drive of the rider collar 3 is here referred to as tangential, meaning tangential to the pivot 9 of the arm 1, although strictly speaking it is only tangential at the midposition of the arm 1 in the middle of its arc of swing.

On account of the high mechanical translation ratio of the spindle, it is possible to position the arm very precisely. Furthermore, very slight displacements of the arm 1 and thereby of the pick-up head 10 carried by it can easily be performed. This device is therefore capable of utilizing the constructional simplicity of rotary motion and at the same time to make possible precise positioning of the pick-up head. Shifting from one track to another can be performed, for example, with high-speed operation of the motor 6, so that the next track to be played is reached relatively quickly. If the motor 6 operates as a stepping motor, it is very easy and simple to make rapid micrometric shifts from one to another of close-packed tracks. Because of the high translation ratio, very slight track fluctuations can also be definitively compensated out.

A further simplification results if the pick-up head 10 is made at least partially movable. For example, it is possible in the case of laser scanning to make the objective lens for bundling the laser ray a movable part. In this case, the arm 1 serves merely to set the pick-up head 10 coarsely on the track to be picked up. Fine tracking then takes place by positioning the objective. This means that for fine tracking merely the small mass of the objective needs to be moved. In this way the drive as a whole can be constituted to operate in a very energy-sparing manner. By the fact that only very slight mass needs to be accelerated, a particularly rapid tracking is made possible. If the pick-up head consists for example of a magnetic head it is possible in basic application of the method above described even to move merely the head itself, for example by a piezoelectric ceramic member in order thereby to obtain tracking precision. The above described device is therefore suitable for magnetic recording and reproducing heads as well as for other heads, such as laser devices. It is particularly advantageous to use the device of the invention for playing compact discs or video discs, especially when the player devices ought to be installed in an environment in which they are subject to shaking, for example in a motor vehicle.

In the illustrated piezoelectric element 12 and a control circuit 13 therefor, both of the kind used, for example, in Kelvin sonds variable capacitor instrumentation, are shown for moving the pick-up 10 transversely of the arm 1. It is to be understood that in case of a laser pick-up the element 12 would move only the optical objective element of the pick-up. Displacement produced in the element 12 is very small. An exaggerated showing of that displacement is illustrated by the broken lines 15.

Although the invention has been described with reference to a particular illustrative example, it will therefore be seen that variations and modifications are possible within the inventive concept.

What is claimed is:

1. Device for movably mounting and for controllably moving a recording and/or reproducing flying transducer contactlessly across the surface of a record medium for selection of record or recording tracks on said medium and for tracking adjustment, comprising:
    a swingable arm pivoted at a first end thereof and holding a said transducer near a second end thereof, said arm being pivoted so as to swing said transducer across said record medium at a constant spacing therefrom;
    a lead-screw spindle having a threaded rider collar thereon slidably constrained so as to be propelled rectilinearly by rotation of said spindle, said spindle being mounted in bearings disposed so as to enable said rider to hold contact with said arm near said second end thereof over an operating swing range of said arm;
    a close-fitting pin-and-cavity sliding linkage between said rider collar and said pivoted arm near said second end thereof for causing swinging of said pivoted arm in response to rotation of said lead-screw spindle;
    means including an electric motor for controllably rotating said lead screw spindle, and
    piezoelectric means for shifting at least part of said transducer relative to said arm, whereby preliminary setting of said transducer on a track may be produced by driving said arm by rotating said lead-screw spindle and precision of tracking can be produced by shifting said transducer relative to said arm.

2. Device according to claim 1, in which said linkage includes a pin fixed on said rider collar projecting into a slot in said pivoted arm.

* * * * *